US011003758B2

(12) United States Patent
Suzuki

(10) Patent No.: US 11,003,758 B2
(45) Date of Patent: May 11, 2021

(54) INFORMATION PROCESSING METHOD, INFORMATION PROCESSING DEVICE, PROGRAM, AND RECORDING MEDIUM

(71) Applicant: TOYOTA JIDOSHA KABUSHIKI KAISHA, Toyota (JP)

(72) Inventor: Shinichi Suzuki, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 346 days.

(21) Appl. No.: 16/002,104

(22) Filed: Jun. 7, 2018

(65) Prior Publication Data

US 2018/0357408 A1  Dec. 13, 2018

(30) Foreign Application Priority Data

Jun. 12, 2017  (JP) .............................. JP2017-115381

(51) Int. Cl.
| | | |
|---|---|---|
| *G06F 9/44* | (2018.01) | |
| *G06F 21/44* | (2013.01) | |
| *G06F 16/11* | (2019.01) | |
| *G06F 21/57* | (2013.01) | |
| *G06F 9/4401* | (2018.01) | |

(52) U.S. Cl.
CPC ............ *G06F 21/44* (2013.01); *G06F 9/4401* (2013.01); *G06F 9/4418* (2013.01); *G06F 16/128* (2019.01); *G06F 21/445* (2013.01); *G06F 21/575* (2013.01)

(58) Field of Classification Search
CPC ............................. G06F 9/4418; G06F 21/575
See application file for complete search history.

(56) References Cited

U.S. PATENT DOCUMENTS

2007/0283140 A1* 12/2007 Jones .................... G06F 21/575
                                                                    713/2
2012/0327473 A1   12/2012  Ito
2018/0204006 A1*  7/2018  Barr ....................... G06F 21/575

FOREIGN PATENT DOCUMENTS

| JP | 2013-004044 A | 1/2013 |
| WO | 2017/012126 A1 | 1/2017 |

* cited by examiner

*Primary Examiner* — Albert Wang
(74) *Attorney, Agent, or Firm* — Oliff PLC

(57) ABSTRACT

An information processing method includes, by an information processing device, acquiring a snapshot of data stored in a main storage device of the information processing device in a state where an external device is not authenticated yet, after the information processing device is powered ON; performing first authentication in which the information processing device authenticates the external device after the snapshot is stored in an auxiliary storage device of the information processing device; and performing second authentication in which the information processing device is started up using the snapshot and authenticates the external device after the information processing device is powered ON again.

8 Claims, 12 Drawing Sheets

INFORMATION PROCESSING METHOD, INFORMATION PROCESSING DEVICE, PROGRAM, AND RECORDING MEDIUM

INCORPORATION BY REFERENCE

The disclosure of Japanese Patent Application No. 2017-115381 filed on Jun. 12, 2017 including the specification, drawings and abstract is incorporated herein by reference in its entirety.

BACKGROUND

1. Technical Field

The present disclosure relates to an information processing method, an information processing device, a program, and a recording medium.

2. Description of Related Art

A technology known in the related art enables an image (data) of a register of a CPU or a memory to be retained as a snapshot in a non-volatile auxiliary storage device after completion of reading and an initialization process of an operating system (OS) and application programs, and enables start-up using the image at the time of subsequent start-up. According to the technology in the related art, an amount of time for the initialization process and the like is not needed, and a device can be started up at a higher speed. The technology in the related art is referred to as snapshot start-up and the like (for example, refer to Japanese Unexamined Patent Application Publication No. 2013-004044 (JP 2013-004044 A)).

SUMMARY

It is assumed that one device needs to be authenticated by another device, and that the one device and the other device are started up again at the same time.

In such a case, when the one device is started up again using the snapshot start-up in the related art, and the other device is started up again as usual by executing the initialization process and the like, the one device is in a state where authentication after the previous start-up is completed, and the other device is in a state where the one device is not authenticated at the current start-up. Thus, a device authentication process may not be normally performed.

The present disclosure provides a technology capable of starting up a device at a higher speed and authenticating an external device after the start-up.

A first aspect of the present disclosure relates to an information processing method including, by an information processing device, acquiring a snapshot of data stored in a main storage device of the information processing device in a state where an external device is not authenticated yet, after the information processing device is powered ON; performing first authentication in which the information processing device authenticates the external device after the snapshot is stored in an auxiliary storage device of the information processing device; and performing second authentication in which the information processing device is started up using the snapshot and authenticates the external device after the information processing device is powered ON again.

According to the first aspect of the present disclosure, the information processing device is started up using the snapshot in a state where the external device is not authenticated yet. Thus, the device can be started up at a higher speed, and the external device can be authenticated after the start-up.

In the information processing method according to the first aspect of the present disclosure, in the first authentication, a process of authenticating the external device may not be started until completion of the acquiring after the information processing device is powered ON.

According to the first aspect of the present disclosure, the snapshot while the external device is not authenticated can be acquired in a state where an initialization process and the like for each program other than a program authenticating the external device are completed to a certain extent.

In the information processing method according to the first aspect of the present disclosure, in the acquiring, the snapshot including data of an inter-device authentication program may be acquired after completion of an initialization process for the inter-device authentication program that authenticates the external device.

According to the first aspect of the present disclosure, the inter-device authentication program is also set as a target for start-up using the snapshot. Thus, the process of authenticating the external device can be performed at a higher speed.

The information processing method according to the first aspect of the present disclosure may further include performing third authentication in which data for authenticating the external device is encrypted or coded using a key that is generated based on data after the external device is authenticated in the first authentication or the second authentication.

According to the first aspect of the present disclosure, by reauthenticating the external device at a predetermined timing after the external device is authenticated, it is possible to determine that the authentication of the external device fails when the external device is replaced with another device after successful authentication. Since the key that is based on the data after the previous authentication has succeeded is used, the authentication process can be simplified by, for example, decreasing the length of the key. Since the authentication performed for the first time can succeed at snapshot start-up, the external device can be reauthenticated as in the first aspect using the key that is generated based on the data after the external device has been authenticated previously.

In the information processing method according to the first aspect of the present disclosure, in the second authentication, the external device may be authenticated by preferentially reading data needed for authenticating the external device from data included in the snapshot after the information processing device is powered ON again. After the second authentication, other data included in the snapshot may be read, and a process that uses the other data may be performed.

According to the first aspect of the present disclosure, the external device can be authenticated in parallel with the loading of the snapshot. Thus, the device can be started up at a higher speed.

The information processing method according to the first aspect of the present disclosure may further include deleting the snapshot stored in the auxiliary storage device when a predetermined program installed on the information processing device is updated. In the acquiring of the snapshot, the snapshot of the data stored in the main storage device of the information processing device may be acquired when the snapshot is not stored in the auxiliary storage device after the information processing device is powered ON.

According to the first aspect of the present disclosure, for example, after software is updated, the snapshot to which the update is applied can be acquired again.

A second aspect of the present disclosure relates to an information processing device including an acquisition unit configured to acquire a snapshot of data stored in a main storage device of the information processing device in a state where an external device is not authenticated yet, after the information processing device is powered ON; a first authentication unit configured to authenticate the external device after the snapshot is stored in an auxiliary storage device of the information processing device; and a second authentication unit configured to authenticate the external device using the snapshot after the information processing device is powered ON again.

According to the second aspect of the present disclosure, the information processing device is started up using the snapshot in a state where the external device is not authenticated yet. Thus, the device can be started up at a higher speed, and the external device can be authenticated after the start-up.

A third aspect of the present disclosure relates to a program that causes an information processing device to execute a process including acquiring a snapshot of data stored in a main storage device of the information processing device in a state where an external device is not authenticated yet, after the information processing device is powered ON; performing first authentication in which the external device is authenticated after the snapshot is stored in an auxiliary storage device of the information processing device; and performing second authentication in which the external device is authenticated using the snapshot after the information processing device is powered ON again.

According to the third aspect of the present disclosure, the information processing device is started up using the snapshot in a state where the external device is not authenticated yet. Thus, the device can be started up at a higher speed, and the external device can be authenticated after the start-up.

A fourth aspect of the present disclosure relates to a computer-readable recording medium on which the program according to the third aspect of the present disclosure is recorded.

According to the aspects of the present disclosure, the device can be started up at a higher speed, and the external device can be authenticated after the start-up.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments of the present disclosure will be described based on the drawings.

System Configuration

Figure 1:
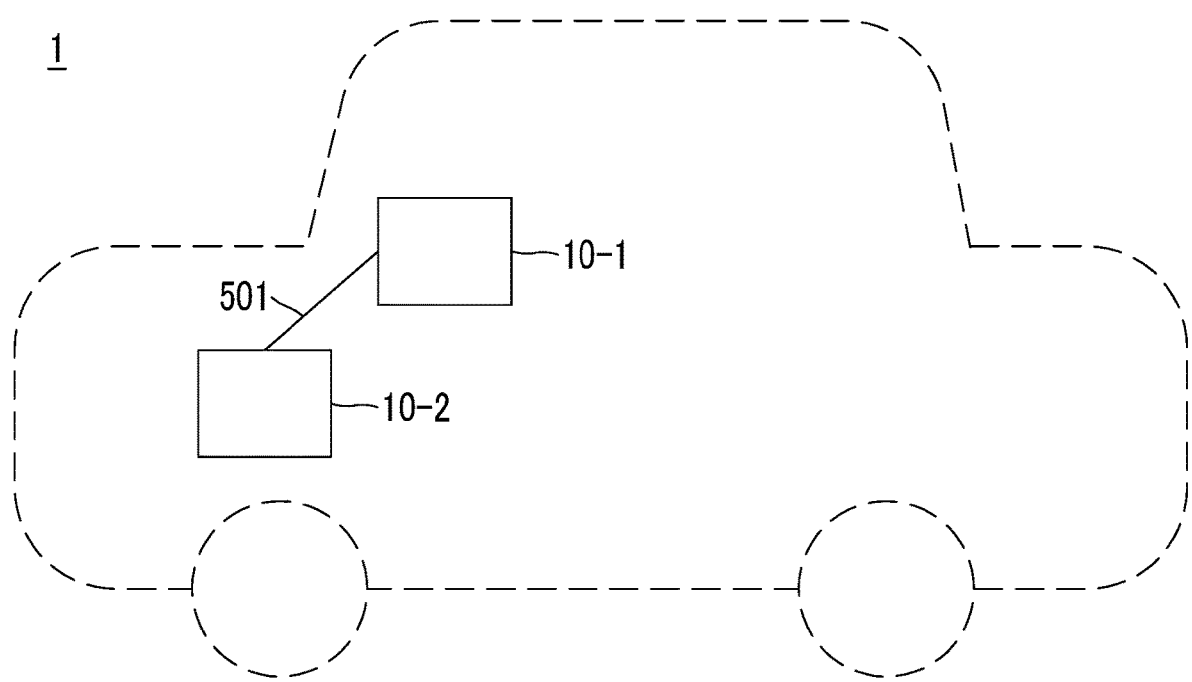
FIG. 1 is a diagram illustrating a configuration example of an information processing system according to an embodiment.

FIG. 1 is a diagram illustrating a configuration example of an information processing system 1 according to an embodiment. In FIG. 1, the information processing system 1 includes information processing devices 10-1, 10-2 (hereinafter, simply referred to as an "information processing device 10" unless otherwise distinguished). The number of information processing devices 10 is not limited to two. For example, a plurality of other information processing devices 10 may be connected to the information processing device 10-1.

Hereinafter, the information processing system 1 will be illustratively described as a navigation system (car navigation system) that is mounted in a vehicle and provides traveling path guidance and the like.

For example, the information processing device 10-1 is a vehicle-mounted device that constitutes the navigation system, and has a function of playing back a digital versatile disc (DVD), a compact disc (CD), television, and radio, or connecting to a mobile phone using short-range wireless communication.

For example, the information processing device 10-2 is a vehicle-mounted device that constitutes the navigation system, and has a function of providing traveling path guidance and the like to a destination specified by a user.

The information processing device 10-1 and the information processing device 10-2 are connected to each other through a bus 501 such as Universal Serial Bus (USB), Ethernet (registered trademark), controller area network (CAN), and digital visual interface (DVI).

By configuring the navigation system with a plurality of devices, the navigation system affects the design of the shape of the vehicle less, and the amount of development work for the entire system can be relatively reduced.

Hardware Configuration

Figure 2:
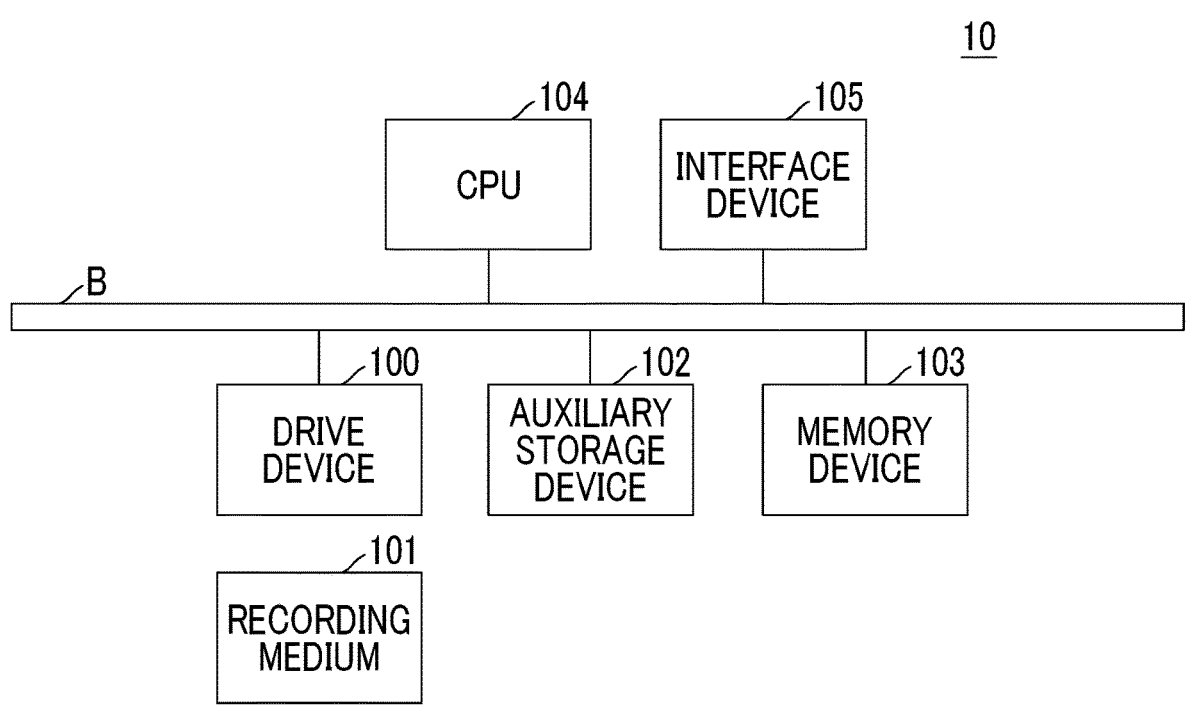
FIG. 2 is a diagram illustrating a hardware configuration example of an information processing device according to the embodiment.

FIG. 2 is a diagram illustrating a hardware configuration example of the information processing device 10 according to the embodiment. The information processing device 10 in FIG. 2 includes a drive device 100, an auxiliary storage device 102, a memory device 103, a CPU 104, an interface device 105, and the like that are connected to each other through a bus B.

For example, an information processing program that implements processes in the information processing device 10 is provided through a recording medium 101. When the recording medium 101 on which the information processing program is recorded is set in the drive device 100, the information processing program is installed on the auxiliary storage device 102 from the recording medium 101 through the drive device 100. The information processing program does not need to be installed through merely the recording medium 101 and may be downloaded from another computer through a network. The auxiliary storage device 102 stores the installed information processing program and also stores needed files, data, and the like.

The memory device 103 is, for example, a random access memory (RAM). When an instruction to start up the program is provided, the memory device 103 reads the program from the auxiliary storage device 102 and stores the program. The CPU 104 implements functions related to the information processing device 10 in accordance with the program stored in the memory device 103. The interface device 105 is used as an interface for connecting to the network.

One example of the recording medium 101 is a portable recording medium such as a CD-ROM, a DVD, or a USB memory. One example of the auxiliary storage device 102 is a hard disk drive (HDD), a flash memory, or the like. Both of the recording medium 101 and the auxiliary storage device 102 are one example of a computer-readable recording medium.

First Embodiment

Functional Configuration

Figure 3:
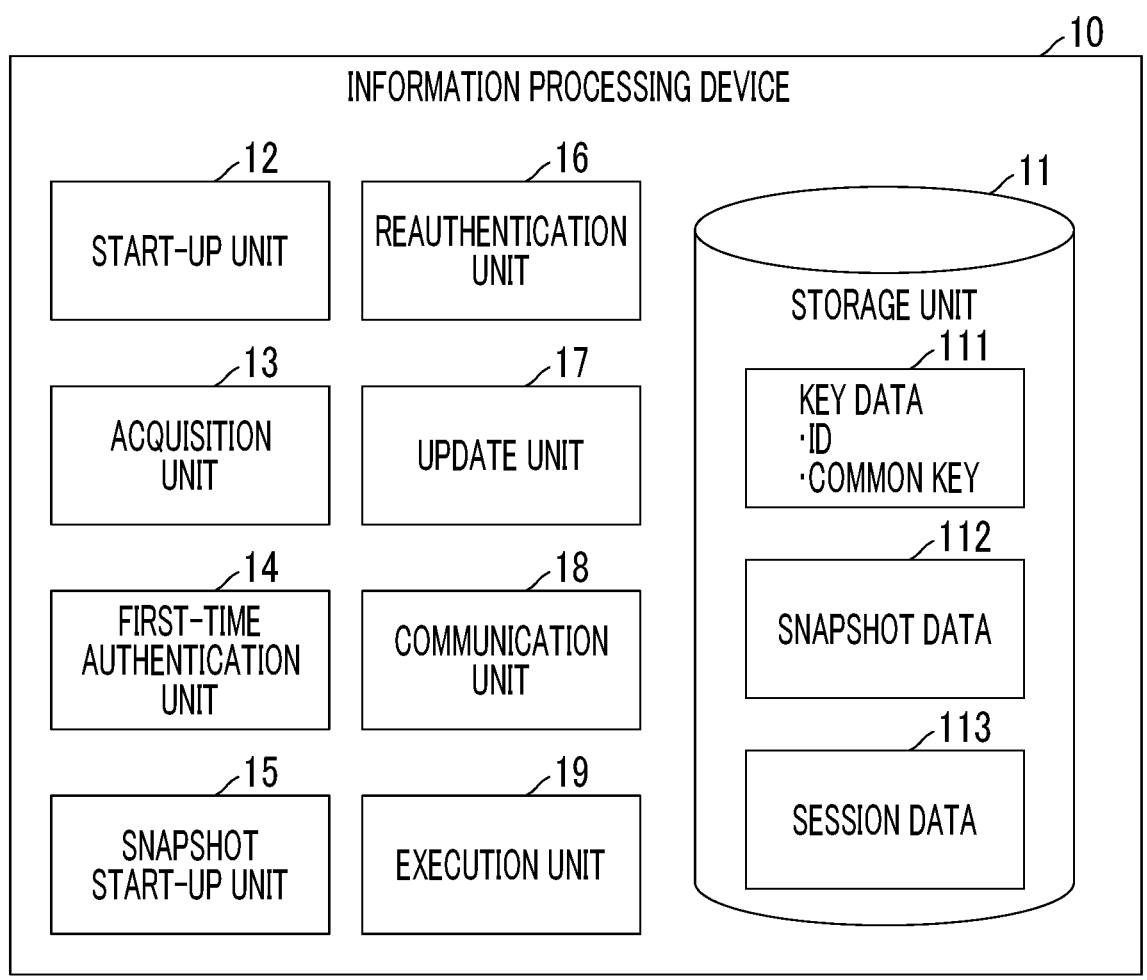
FIG. 3 is a diagram illustrating one example of a function block diagram of an information processing device according to a first embodiment.

A functional configuration of the information processing device 10 according to a first embodiment will be described with reference to FIG. 3. FIG. 3 is a diagram illustrating one example of a function block diagram of the information processing device 10 according to the first embodiment. The information processing device 10 includes a start-up unit 12, an acquisition unit 13, a first-time authentication unit (one example of a "first authentication unit") 14, a snapshot start-up unit 15, a reauthentication unit (one example of a "second authentication unit") 16, an update unit 17, a communication unit 18, and an execution unit 19. Each unit represents a function implemented by a process that one or more programs installed on the information processing device 10 cause the CPU 104 of the information processing device 10 to execute.

The start-up unit 12 controls start-up and stop (shutdown) of the information processing device 10. The start-up unit 12 starts up the information processing device 10 without using a snapshot after the information processing device 10 is powered ON. The start-up unit 12 stops the information processing device 10 after the information processing device 10 is powered OFF.

After the information processing device 10 is powered ON, the acquisition unit 13 acquires a snapshot of data stored in a register of the CPU 104, the memory device 103, and the like that are main storage devices of the information processing device 10, in a state where another information processing device 10 (one example of an "external device") is not authenticated yet. The acquisition unit 13 stores the acquired snapshot in snapshot data 112 of the storage unit 11.

When the information processing device 10 is started up for the first time, the first-time authentication unit 14 authenticates the other information processing device 10 after the snapshot acquired by the acquisition unit 13 is stored in the storage unit 11. When the information processing device 10 is started up again, the first-time authentication unit 14 authenticates the other information processing device 10 using the snapshot data 112 stored in the storage unit 11. The first-time authentication unit 14 is implemented by an inter-device authentication program that is a predetermined program installed on the information processing device 10.

The snapshot start-up unit 15 starts up the information processing device 10 using the snapshot data 112 stored in the storage unit 11. The snapshot start-up unit 15 is implemented by a high-speed start-up program that is a predetermined program installed on the information processing device 10.

The reauthentication unit 16 performs encryption or coding using a session key that is generated based on session data 113, and authenticates the other information processing device 10. The session data 113 is data after the previous authentication of the other information processing device 10.

The update unit 17 deletes the snapshot data 112 stored in the storage unit 11 when the predetermined programs installed on the information processing device 10 are updated. The communication unit 18 communicates with the other information processing device 10, an external server, and the like.

The execution unit 19 executes the predetermined application programs and the like installed on the information processing device 10.

The information processing device 10 includes the storage unit 11. The storage unit 11 is implemented using the auxiliary storage device 102 and the like. The storage unit 11 stores key data 111, the snapshot data 112, the session data 113, and the like.

Process

When Started Up for First Time (Merely One Retains Snapshot)

Figure 4:
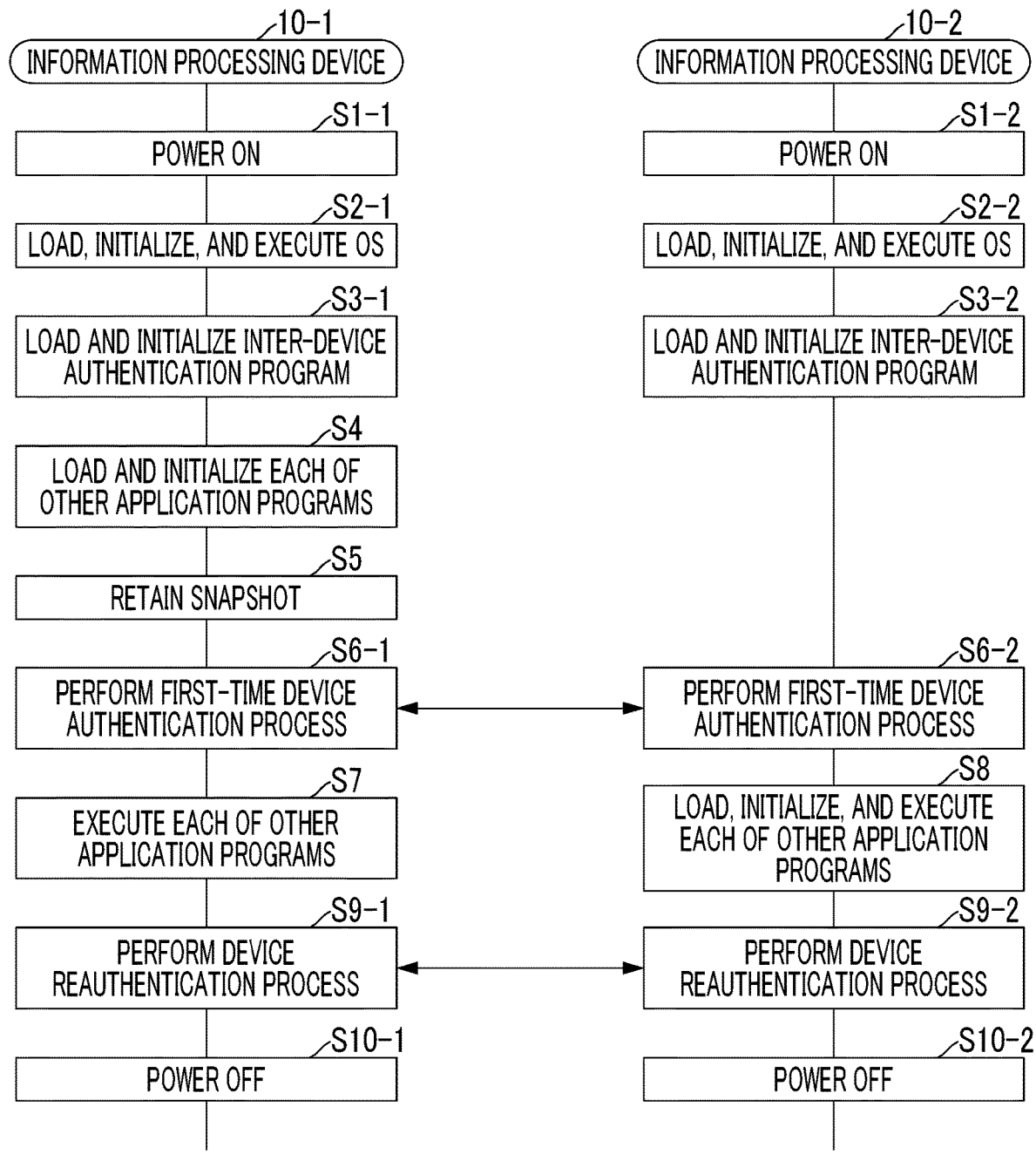
FIG. 4 is a sequence diagram illustrating one example of a process when an information processing system according to the first embodiment is started up for the first time.

A process when the information processing system 1 according to the first embodiment is started up for the first time will be described with reference to FIG. 4. FIG. 4 is a sequence diagram illustrating one example of a process when the information processing system 1 according to the first embodiment is started up for the first time. For example, the following process is executed after the information processing system 1 is powered ON for the first time, and after the information processing system 1 is started up for the first time after the programs of the information processing device 10 are updated by version update and the like.

In the following description, for example, the information processing device 10-1 retains the snapshot, and the information processing device 10-2 is started up as usual.

In step S1-1 and step S1-2, the information processing device 10-1 and the information processing device 10-2 are powered ON.

The start-up unit 12 of each of the information processing device 10-1 and the information processing device 10-2 loads (reads), initializes, and executes an operating system (OS) (step S2-1 and step S2-2). The OS may be loaded by a bootloader and the like of the CPU 104.

The start-up unit 12 of each of the information processing device 10-1 and the information processing device 10-2 loads and initializes the inter-device authentication program (step S3-1 and step S3-2).

The start-up unit 12 of the information processing device 10-1 loads and initializes each of the other application programs in the information processing device 10-1 (step S4).

The acquisition unit 13 of the information processing device 10-1 acquires the snapshot and retains the snapshot in the snapshot data 112 of the storage unit 11 (step S5). For example, the information processing device 10-1 determines whether or not the snapshot has already been retained using the high-speed start-up program. When the snapshot is not retained, the information processing device 10-1 determines that the information processing device 10-1 is started up for the first time, and retains an image of the register of the CPU 104 or the memory device 103 as a snapshot in the non-volatile auxiliary storage device 102. Accordingly, the image retained as a snapshot can be read after a device such as a vehicle-mounted device that is completely stopped from being supplied with electric power after power-OFF in order to minimize non-operational electric power consumption is started up again.

The first-time authentication unit 14 of each of the information processing device 10-1 and the information processing device 10-2 executes the inter-device authentication program and performs a first-time device authentication process (step S6-1 and step S6-2). The information processing device 10-1 and the information processing device 10-2 authenticate each other. Merely one of the information processing device 10-1 and the information processing device 10-2 may authenticate the other. Accordingly, connection error or invalid connection between devices can be suppressed.

The first-time authentication unit 14 of the information processing device 10-1 does not perform the authentication process for the information processing device 10-2 using the inter-device authentication program while the process of retaining the snapshot in step S5 is being completed. Accordingly, data generated in the middle of the authentication process and data after the completion of the authentication process are securely excluded from the snapshot in a state (timing) where the initialization process for each of the other application programs is completed to a certain extent.

The execution unit 19 of the information processing device 10-1 executes each of the other application programs in the information processing device 10-1 (step S7).

The start-up unit 12 of the information processing device 10-2 loads, initializes, and executes each of the other application programs in the information processing device 10-2 (step S8).

The process of step S7 in the information processing device 10-1 is performed in parallel with the process of step S8 in the information processing device 10-2. By the processes of step S7 and step S8, the information processing device 10-1 and the information processing device 10-2 execute processes of playing back music, providing path guidance, and the like in response to an operation and the like of the user.

The reauthentication unit 16 of each of the information processing device 10-1 and the information processing device 10-2 executes the inter-device authentication program and performs a device reauthentication process (step S9-1 and step S9-2). For example, the reauthentication unit 16 of each of the information processing device 10-1 and the information processing device 10-2 repeats the device reauthentication process until power-OFF at periodic timings or a timing at which plugging of a cable for connecting to the other information processing device is detected. Accordingly, when a device is successfully authenticated and then, is replaced with another device, the replacement device can be authenticated.

For example, the start-up unit 12 of each of the information processing device 10-1 and the information processing device 10-2 stops processes performed by the execution unit 19 and the like, and powers the information processing device 10-1 and the information processing device 10-2 OFF in response to a power-OFF operation in the vehicle (step S10-1 and step S10-2).

When Started Up for First Time (Each Retains Snapshot)

Figure 5:
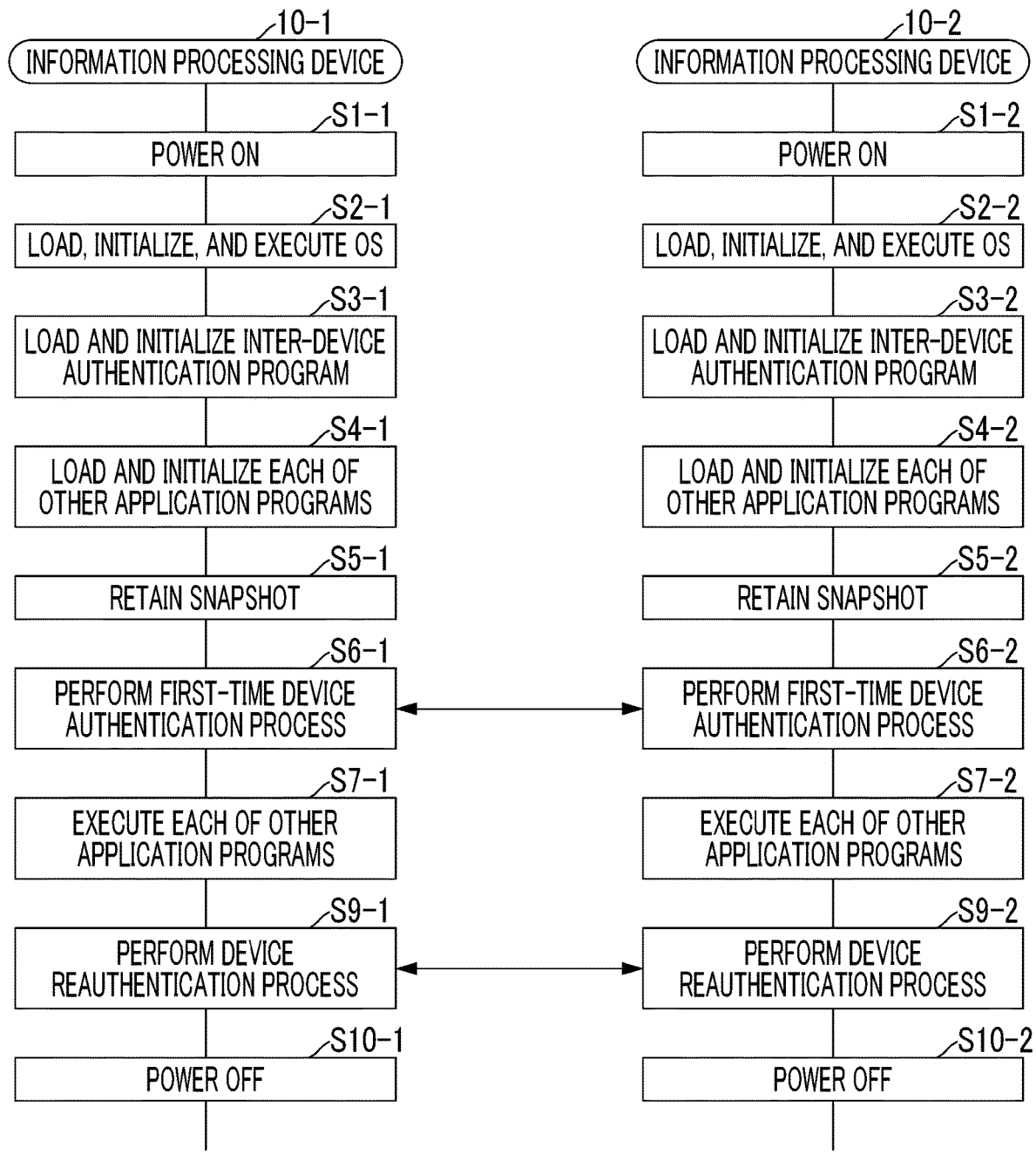
FIG. 5 is a sequence diagram illustrating one example of a process when the information processing system according to the first embodiment is started up for the first time.

A process when the information processing system 1 according to the first embodiment is started up for the first time will be described with reference to FIG. 5. FIG. 5 is a sequence diagram illustrating one example of a process when the information processing system 1 according to the first embodiment is started up for the first time.

In the following description, for example, each of the information processing device 10-1 and the information processing device 10-2 retains the snapshot.

In such a case, the process procedure of the information processing device 10-2 is the same as the process procedure of the information processing device 10-1 illustrated in FIG. 4. That is, the processes of step S4-1, step S5-1, and step S7-1 in the information processing device 10-1 and the processes of step S4-2, step S5-2, and step S7-2 in the information processing device 10-2 are the same as the processes of step S4, step S5, and step S7 illustrated in FIG. 4.

First-Time Device Authentication Process

Figure 6:
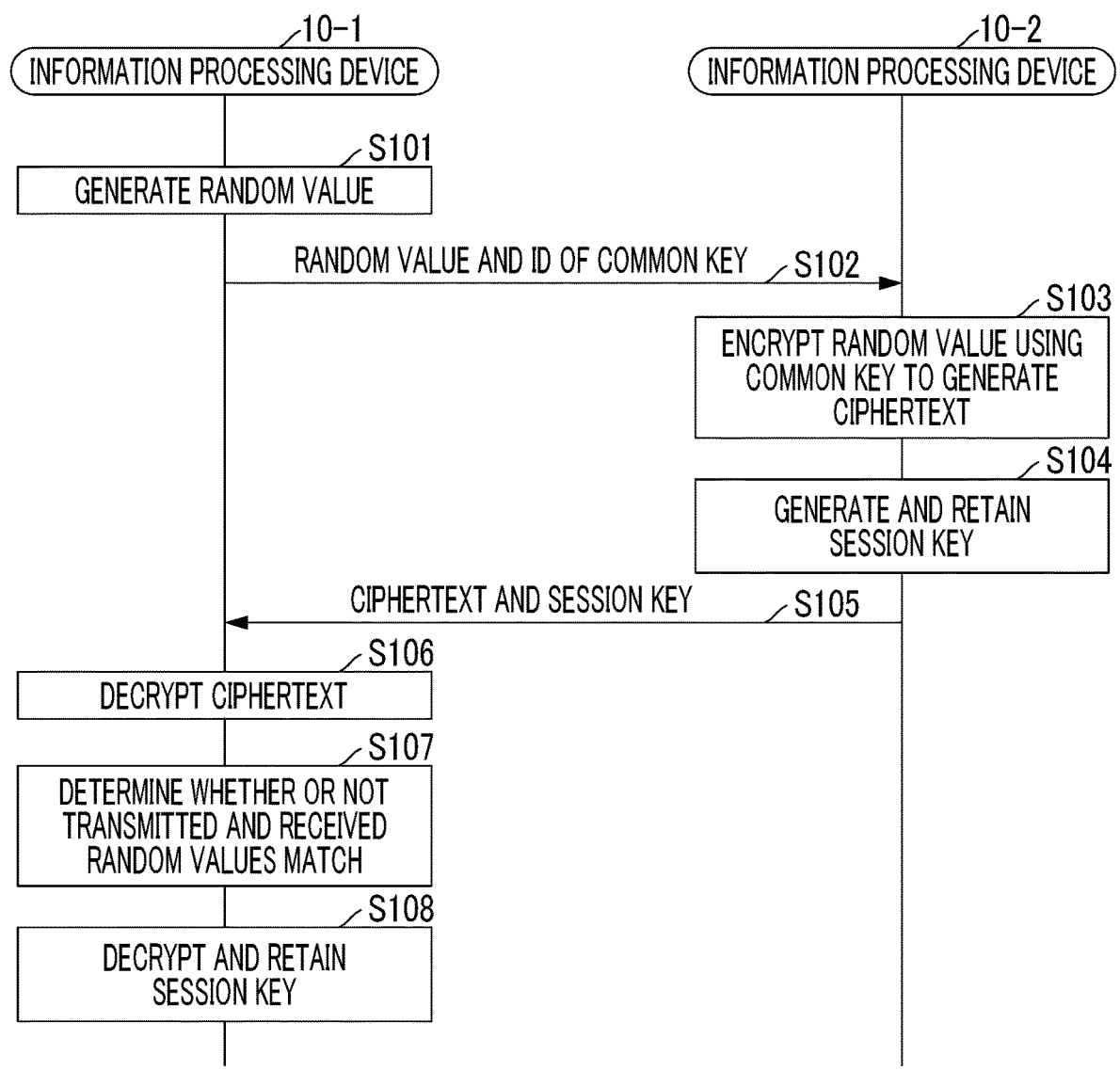
FIG. 6 is a sequence diagram illustrating one example of a first-time device authentication process of the information processing system according to the embodiment.

The first-time device authentication process of the first-time authentication unit 14 in step S6-1 and step S6-2 in FIG. 4 and FIG. 5 will be described with reference to FIG. 6. FIG. 6 is a sequence diagram illustrating one example of the first-time device authentication process of the information processing system 1 according to the embodiment.

In the following description, the information processing device 10-1 authenticates the information processing device 10-2. When the information processing device 10-1 and the information processing device 10-2 authenticate each other, the following process is performed for each of the information processing device 10-1 and the information processing device 10-2.

In step S101, the first-time authentication unit 14 of the information processing device 10-1 generates a random value.

The first-time authentication unit 14 of the information processing device 10-1 transmits the generated random value and an ID (number) of a common key to the information processing device 10-2 (step S102). Each of the random value and the ID of the common key has a different value each time the first-time device authentication process is performed.

The first-time authentication unit 14 of the information processing device 10-2 references the key data 111 and generates a ciphertext by encrypting the received random value using the common key corresponding to the received ID of the common key (step S103). Data of the common key is stored in advance in the key data 111 in association with the ID.

The first-time authentication unit 14 of the information processing device 10-2 generates a session key using the session data 113 that is predetermined data in the first-time device authentication process, and retains the session key (step S104).

The first-time authentication unit 14 of the information processing device 10-2 transmits the generated ciphertext and the session key to the information processing device 10-1 (step S105). For example, the first-time authentication unit 14 of the information processing device 10-2 transmits the session key after encrypting the session key using the common key corresponding to the received ID of the common key.

The first-time authentication unit 14 of the information processing device 10-1 decrypts the received ciphertext using the common key corresponding to the ID of the common key transmitted in step S102 (step S106).

The first-time authentication unit 14 of the information processing device 10-1 determines whether or not the random value included in the decrypted ciphertext matches the random value transmitted in step S102 (step S107). When the random values match, the first-time authentication unit 14 of the information processing device 10-1 determines that the device authentication succeeds. When the random values do not match, the first-time authentication unit 14 of the information processing device 10-1 determines that the device authentication fails, and causes the communication unit 18 of the information processing device 10-1 to disconnect the communication with the information processing device 10-2.

The first-time authentication unit 14 of the information processing device 10-1 decrypts and retains the session key (step S108).

Device Reauthentication Process

Figure 7:
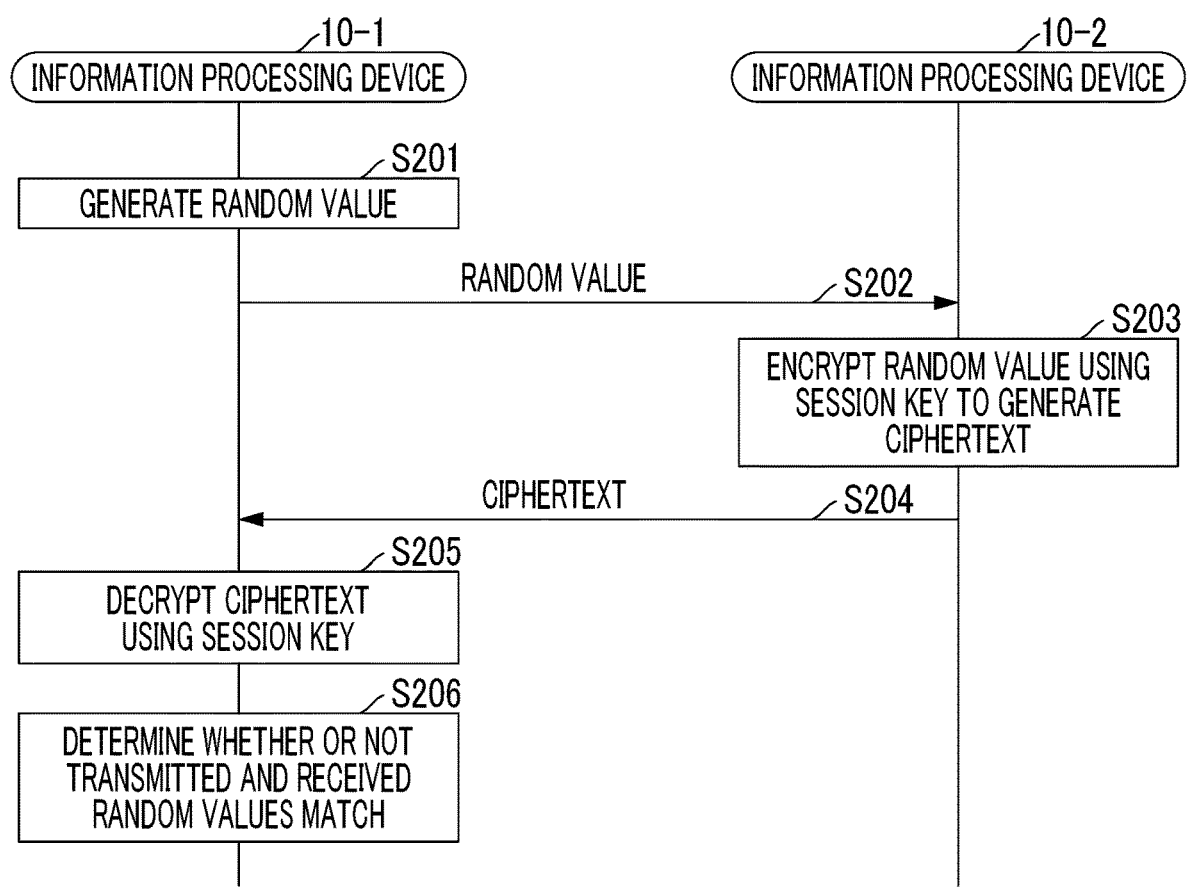
FIG. 7 is a sequence diagram illustrating one example of a device reauthentication process of the information processing system according to the embodiment.

The device reauthentication process of the reauthentication unit 16 in step S9-1 and step S9-2 in FIG. 4 and FIG. 5 will be described with reference to FIG. 7. FIG. 7 is a sequence diagram illustrating one example of the device reauthentication process of the information processing system 1 according to the embodiment.

In the following description, the information processing device 10-1 authenticates the information processing device 10-2. When the information processing device 10-1 and the information processing device 10-2 authenticate each other, the following process is performed for each of the information processing device 10-1 and the information processing device 10-2.

In step S201, the reauthentication unit 16 of the information processing device 10-1 generates a random value.

The reauthentication unit 16 of the information processing device 10-1 transmits the generated random value to the information processing device 10-2 (step S202).

The reauthentication unit 16 of the information processing device 10-2 generates a ciphertext by encrypting the received random value using the session key (step S203).

The reauthentication unit 16 of the information processing device 10-2 transmits the ciphertext including the encrypted random value to the information processing device 10-1 (step S204).

The reauthentication unit 16 of the information processing device 10-1 decrypts the received ciphertext using the session key (step S205).

The reauthentication unit 16 of the information processing device 10-1 determines whether or not the random value included in the decrypted ciphertext matches the random value transmitted in step S202 (step S206). When the random values match, the reauthentication unit 16 of the information processing device 10-1 determines that the device authentication succeeds. When the random values do not match, the reauthentication unit 16 of the information processing device 10-1 determines that the device authentication fails, and causes the communication unit 18 of the information processing device 10-1 to disconnect the communication with the information processing device 10-2.

As described thus far, in the device reauthentication process, authentication is performed using the session key that is a key, for example, having a relatively short length and is generated using data when the previous device authentication has succeeded. Thus, the device authentication process can be performed at a higher speed than the first-time device authentication process.

The first-time device authentication process and the device reauthentication process may use a well-known device authentication method such as a public key instead of using the common key.

When Started Up Again (Merely One is Started Up Using Snapshot)

Figure 8:
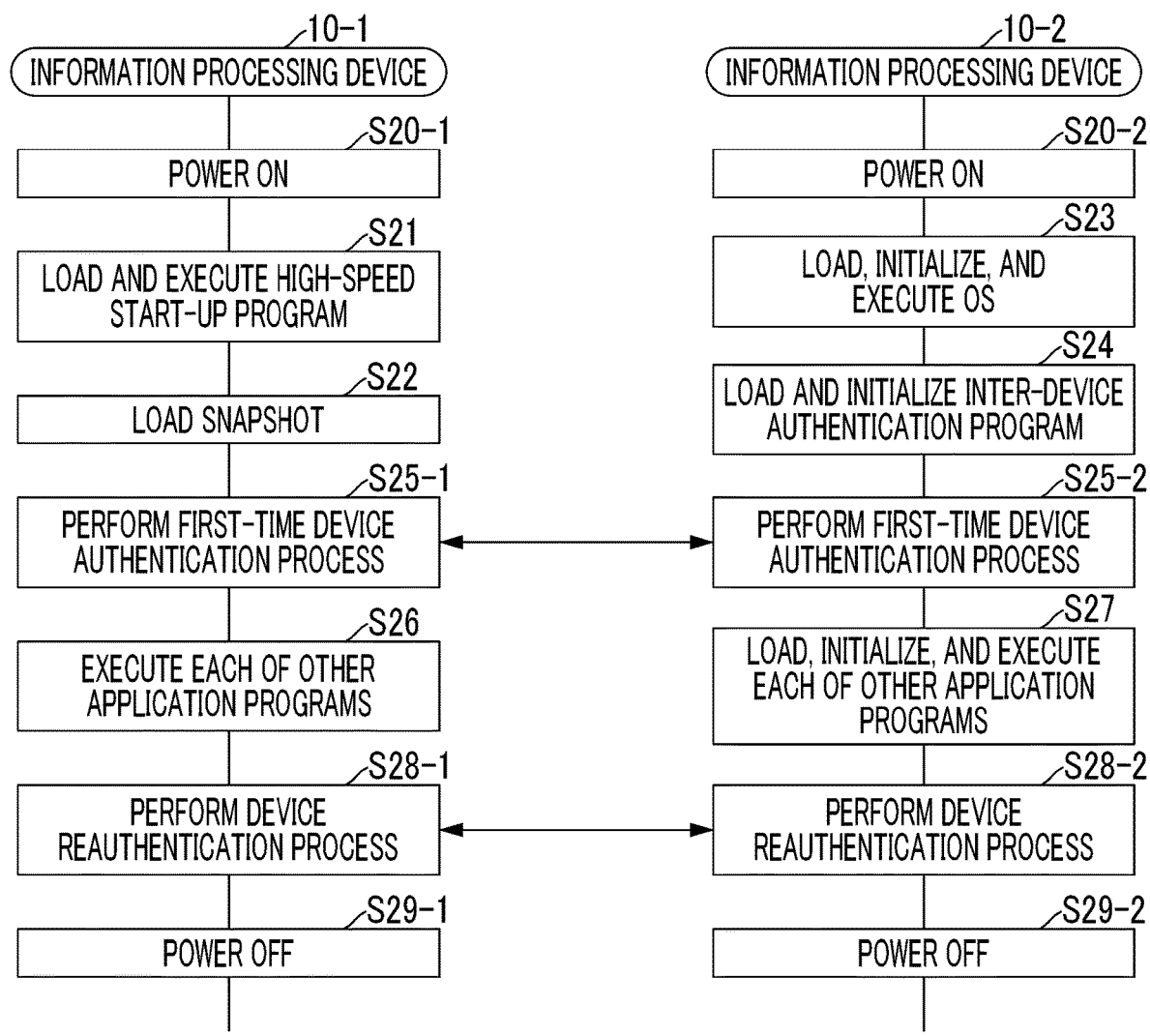
FIG. 8 is a sequence diagram illustrating one example of a process when the information processing system according to the first embodiment is started up again.

A process when the information processing system 1 according to the first embodiment is started up again will be described with reference to FIG. 8. FIG. 8 is a sequence diagram illustrating one example of a process when the information processing system 1 according to the first embodiment is started up again.

In the following description, for example, the information processing device 10-1 is started up using the snapshot, and the information processing device 10-2 is started up as usual.

In step S20-1 and step S20-2, the information processing device 10-1 and the information processing device 10-2 are powered ON.

The snapshot start-up unit 15 of the information processing device 10-1 loads and executes the high-speed start-up program for start-up using the snapshot (step S21). For example, the high-speed start-up program is executed in a basic input-output system (BIOS) of the information processing device 10-1.

The snapshot start-up unit 15 of the information processing device 10-1 loads the snapshot data 112 retained in step S5 in FIG. 4 using the high-speed start-up program (step S22). For example, the information processing device 10-1 determines whether or not the snapshot data 112 has already been retained using the high-speed start-up program. When the snapshot data 112 has been retained, the information processing device 10-1 determines that the information processing device 10-1 is started up again, and loads the snapshot.

The start-up unit 12 of the information processing device 10-2 loads (reads), initializes, and executes the OS (step S23).

The start-up unit 12 of the information processing device 10-2 loads and initializes the inter-device authentication program (step S24).

The processes of step S21 and step S22 in the information processing device 10-1 are performed in parallel with the processes of step S23 and step S24 in the information processing device 10-2.

The snapshot start-up unit 15 of the information processing device 10-1 executes the first-time device authentication process in step S25-1 in parallel with the process of executing each of the other application programs in step S26. When the information processing device 10-1 is started up again, the snapshot start-up unit 15 of the information processing device 10-1 may set the priority of a task of the inter-device authentication program to be higher than the priority of a task of each of the other application programs in the OS. Accordingly, the first-time device authentication process is executed preferentially over the initialization process for each of the other application programs that is executed after the snapshot is retained by the acquisition unit 13. Thus, when it takes a relatively long amount of time to complete the first-time device authentication process, the amount of time for completing the start-up of the entire information processing system 1 can be reduced.

The subsequent processes of steps S25-1 and S25-2 to steps S29-1 and S29-2 are the same as the processes of steps S6-1 and S6-2 to steps S10-1 and S10-2 in FIG. 4.

When Started Up Again (Each is Started Up Using Snapshot)

Figure 9:
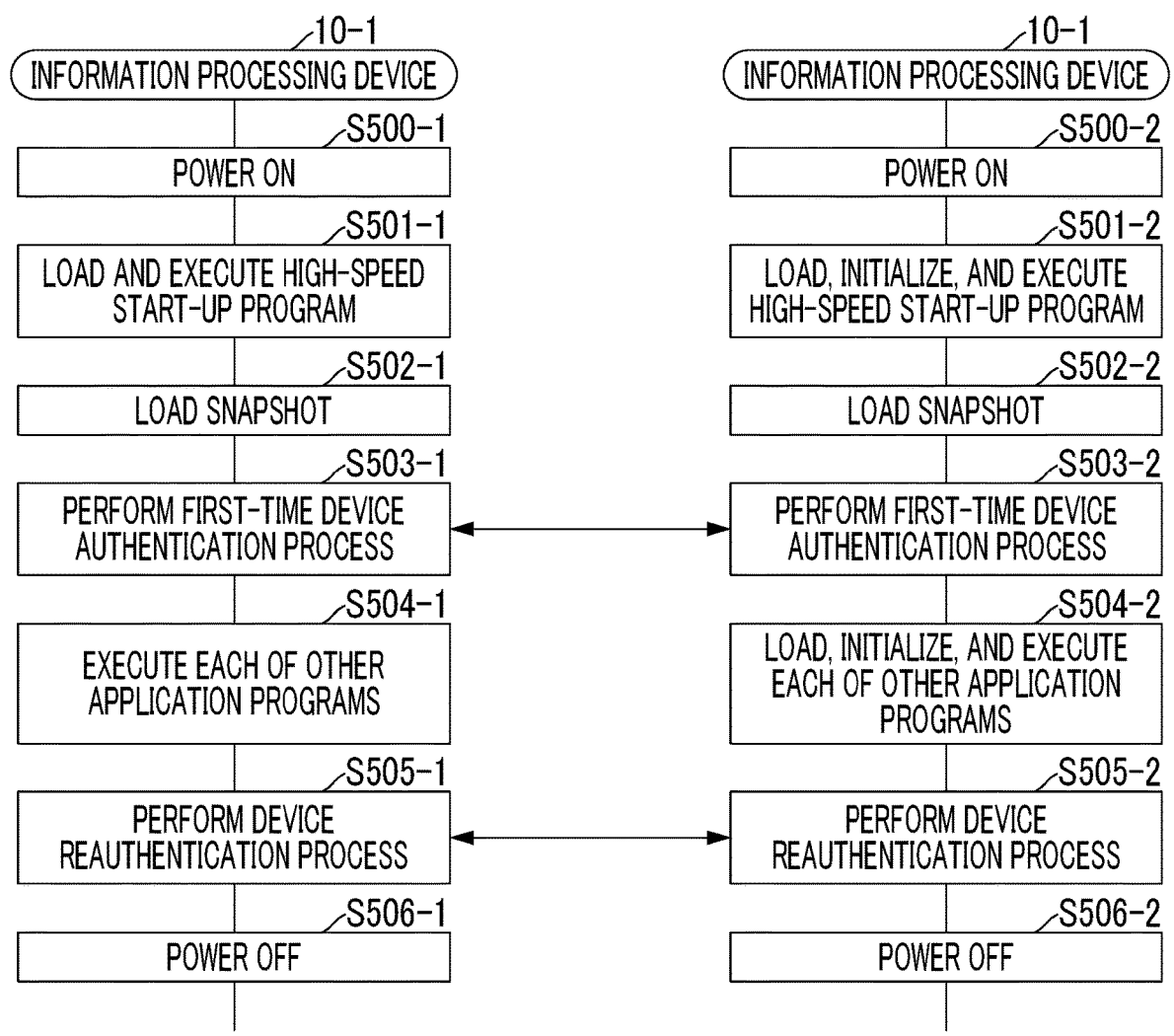
FIG. 9 is a sequence diagram illustrating one example of a process when the information processing system according to the first embodiment is started up again.

A process when the information processing system 1 according to the first embodiment is started up again will be described with reference to FIG. 9. FIG. 9 is a sequence diagram illustrating one example of a process when the information processing system 1 according to the first embodiment is started up again.

In the following description, for example, each of the information processing device 10-1 and the information processing device 10-2 is started up using the snapshot.

In such a case, the process procedure of each of the information processing device 10-1 and the information processing device 10-2 is the same as the process procedure of the information processing device 10-1 illustrated in FIG. 8. That is, the processes of step S500-1 to step S506-1 in the information processing device 10-1 and step S500-2 to step S506-2 in the information processing device 10-2 are the same as the processes of step S20-1, step S21, step S22, step S25-1, step S26, step S28-1, and step S29-1 illustrated in FIG. 8.

According to the first embodiment, for example, the first embodiment does not need a separate dedicated chip that is needed when data related to the device authentication process is excluded from a snapshot target by performing the device authentication process using a separate dedicated chip. The image after the initialization process for the inter-device authentication program is completed can be included in the snapshot. Thus, the device authentication process can be performed at a higher speed.

Second Embodiment

In the first embodiment, for example, the image after the inter-device authentication program is loaded and initialized is retained in the snapshot.

In a second embodiment, for example, the image related to the inter-device authentication program is not included in the snapshot. The second embodiment is substantially the same as the first embodiment and thus, will not be fully described. In the following description, common parts in the first embodiment will not be described, and merely different parts will be described. According to the second embodiment, for example, the same effect as the first embodiment is achieved when the process of loading or initializing the inter-device authentication program is performed at a sufficiently high speed.

Process

When Started Up for First Time (Snapshot is Retained)

Figure 10:
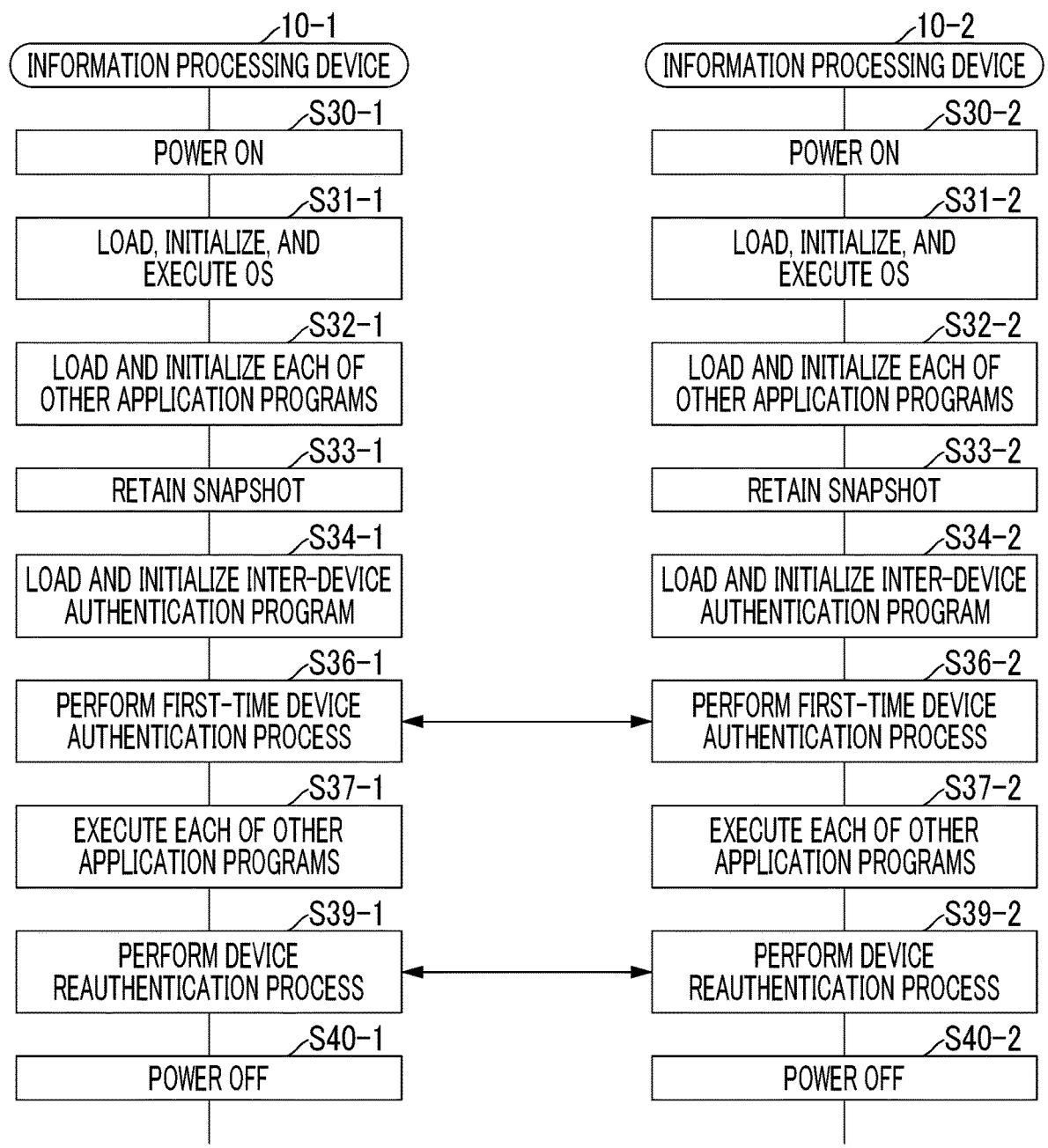
FIG. 10 is a sequence diagram illustrating one example of a process when an information processing system according to a second embodiment is started up for the first time.

A process when the information processing system 1 according to the second embodiment is started up for the first time will be described with reference to FIG. 10. FIG. 10 is a sequence diagram illustrating one example of a process when the information processing system 1 according to the second embodiment is started up for the first time.

The processes of steps S30-1 and S30-2 to steps S31-1 and S31-2 corresponding to power-ON to the execution of the OS are the same as the processes of steps S1-1 and S1-2 to steps S2-1 and S2-2 in FIG. 4.

The start-up unit 12 of each of the information processing device 10-1 and the information processing device 10-2 loads and initializes each of the other application programs in the information processing device 10-1 and the information processing device 10-2 (step S32-1 and step S32-2).

The acquisition unit 13 of each of the information processing device 10-1 and the information processing device 10-2 retains the snapshot (step S33-1 and step S33-2).

The start-up unit 12 of the information processing device 10-1 loads and initializes the inter-device authentication program (step S34-1).

The start-up unit 12 of the information processing device 10-2 loads and initializes the inter-device authentication program (step S34-2).

The subsequent processes of steps S36-1 and S36-2 to steps S40-1 and S40-2 are the same as the processes of steps S6-1 and S6-2 to steps S10-1 and S10-2 in FIG. 4.

When Started Up Again (Started Up Using Snapshot)

Figure 11:
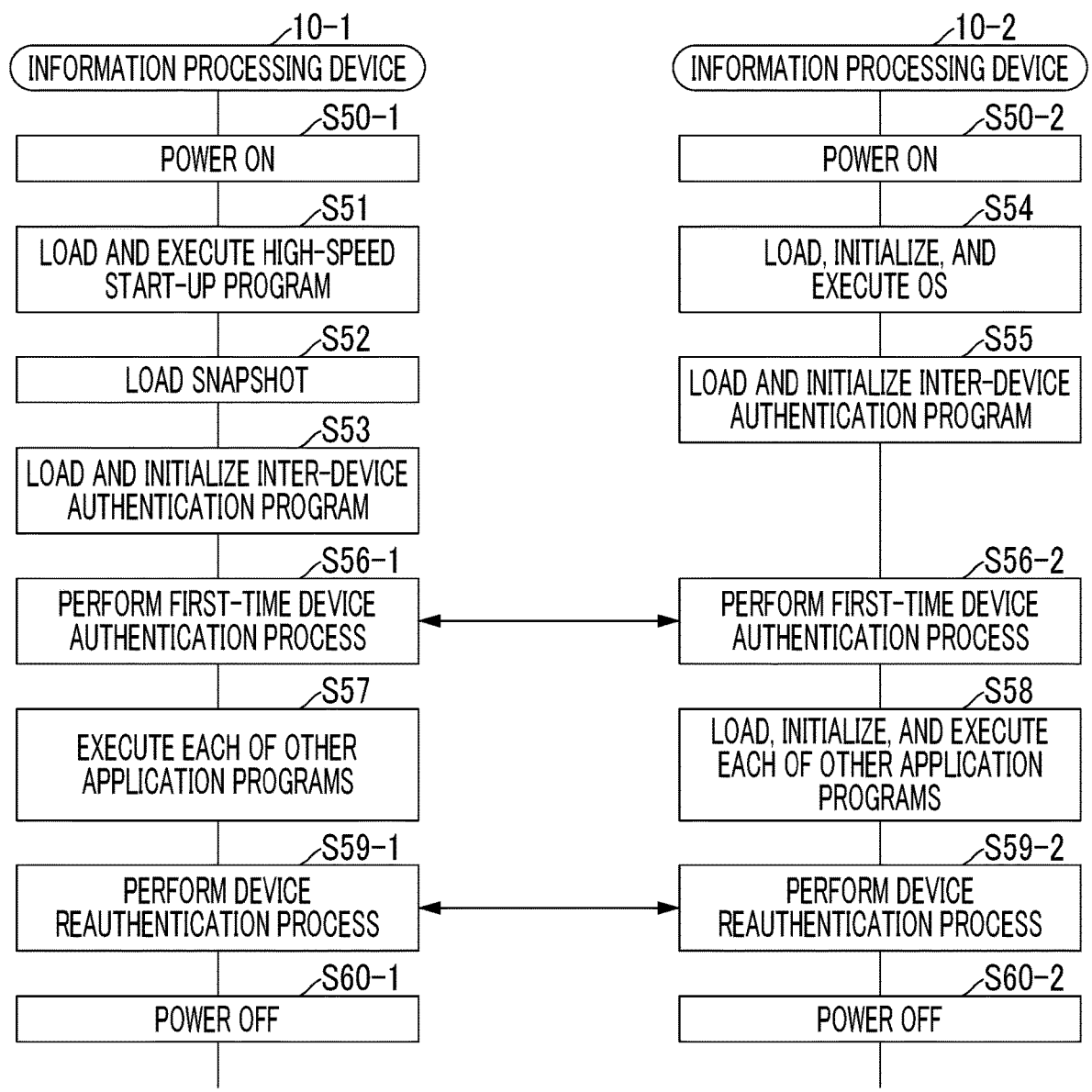
FIG. 11 is a sequence diagram illustrating one example of a process when the information processing system according to the second embodiment is started up again.

A process when the information processing system 1 according to the second embodiment is started up again will be described with reference to FIG. 11. FIG. 11 is a sequence diagram illustrating one example of a process when the information processing system 1 according to the second embodiment is started up again.

The processes of steps S50-1 and S50-2 to step S52 corresponding to power-ON to the loading of the snapshot are the same as the processes of steps S20-1 and S20-2 to step S22 in FIG. 8.

The start-up unit 12 of the information processing device 10-1 loads and initializes the inter-device authentication program (step S53).

The subsequent processes of step S54 to steps S60-1 and S60-2 are the same as the processes of step S23 to steps S29-1 and S29-2 in FIG. 8.

Third Embodiment

In the first embodiment, for example, the first-time device authentication process is executed after the loading of the snapshot is completed.

In a third embodiment, for example, the first-time device authentication process is executed at a timing when the loading of the image related to the inter-device authentication program is completed while the snapshot is being loaded. The third embodiment is substantially the same as the first embodiment and thus, will not be fully described. In the following description, common parts in the first embodiment will not be described, and merely different parts will be described.

According to the third embodiment, for example, the process of loading the image related to each of the other application programs in the snapshot can be executed in parallel with the first-time device authentication process for the other information processing device 10. The amount of waiting time until the start of the first-time device authentication process from power-ON in the other information processing device 10 is reduced. Thus, the other information processing device 10 can be started up at a higher speed.

Process

When Started Up Again (Started Up Using Snapshot)

Figure 12:
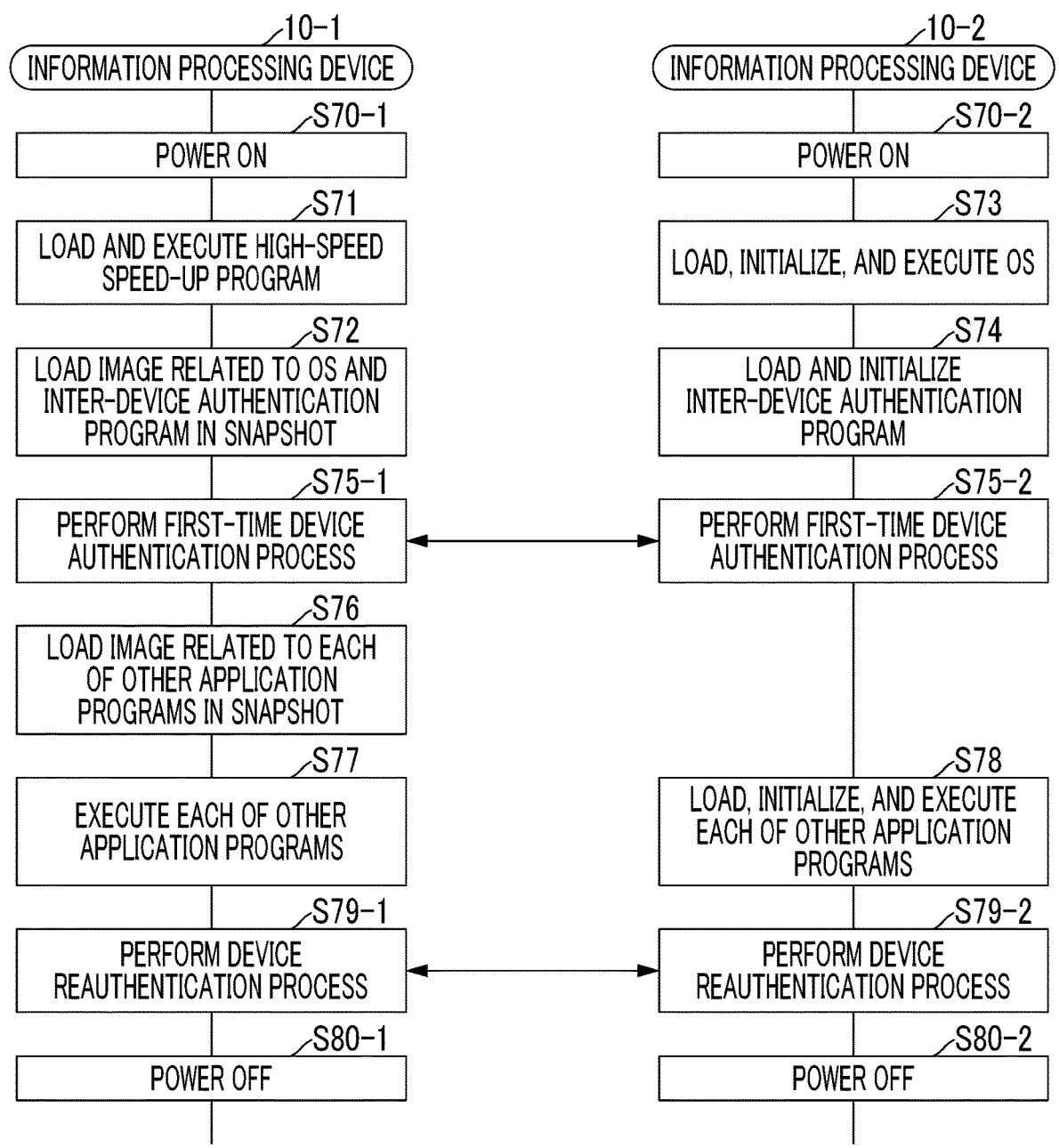
FIG. 12 is a sequence diagram illustrating one example of a process when an information processing system according to a third embodiment is started up again.

A process when the information processing system 1 according to the third embodiment is started up again will be described with reference to FIG. 12. FIG. 12 is a sequence diagram illustrating one example of a process when the information processing system 1 according to the third embodiment is started up again.

The processes of steps S70-1 and S70-2 to step S71 corresponding to power-ON to the execution of the high-speed start-up program are the same as the processes of steps S20-1 and S20-2 to step S21 in FIG. 8.

The snapshot start-up unit 15 of the information processing device 10-1 preferentially loads the image related to the OS and the inter-device authentication program in the snapshot retained in step S5 in FIG. 4 using the high-speed start-up program (step S72). For example, the acquisition unit 13 may separately store snapshot data 112A and snapshot data 112B in advance in the storage unit 11. The snapshot data 112A is the image related to the OS and the inter-device authentication program. The snapshot data 112B is the image related to each of the other application programs. The snapshot start-up unit 15 may first read the snapshot data 112A, execute the inter-device authentication program, and execute the first-time device authentication process for the information processing device 10-2.

The subsequent processes of step S73 to steps S75-1 and S75-2 are the same as the processes of step S23 to steps S25-1 and S25-2 in FIG. 8.

The snapshot start-up unit 15 of the information processing device 10-1 loads the image related to each of the other application programs in the snapshot retained in step S5 in FIG. 4 using the high-speed start-up program (step S76). The snapshot start-up unit 15 of the information processing device 10-1 may execute the first-time device authentication process in step S75-1 in parallel with the process of loading the image related to each of the other application programs in step S76. Accordingly, the amount of time until the completion of start-up when the information processing device 10 is started up again is further reduced.

The subsequent processes of step S77 to steps S80-1 and S80-2 are the same as the processes of step S26 to steps S29-1 and S29-2 in FIG. 8.

While embodiments of the present disclosure are described in detail thus far, the present disclosure is not limited to such specific embodiments. Various modifications or changes can be carried out within the nature of the present disclosure disclosed in the claims.

For example, each functional unit of the information processing device 10 may be implemented by cloud computing configured with one or more computers.

What is claimed is:

1. An information processing method for use with an information processing device connected to at least one external device, the information processing method comprising:
powering ON the information processing device;
acquiring, from the information processing device, a snapshot of data stored in a main memory of the information processing device in a state where the at least one external device is not authenticated, after the information processing device is powered ON;
storing the snapshot of data in an auxiliary memory of the information processing device;
performing a first authentication of the at least one external device in which the information processing device authenticates the external device after the snapshot of data is stored in the auxiliary memory;
re-starting the information processing device based on the snapshot of data stored in the auxiliary memory; and
performing a second authentication of the at least one external device in which the information processing device re-authenticates the at least one external device again after the information processing device is re-started based on the snapshot of data.

2. The information processing method according to claim 1, wherein a process of the first authentication of the external device is not started until the snapshot of data is completely acquired from the information processing device.

3. The information processing method according to claim 1, wherein
the snapshot of data includes data of an inter-device authentication program for authenticating the external device, and
the snapshot of data, which includes the inter-device authentication program, is acquired only after completion of an initialization process for the inter-device authentication program.

4. The information processing method according to claim 1, further comprising:
performing a third authentication of the at least one external device in which data for authenticating the external device is encrypted or coded using a key that is generated based on data after the external device is authenticated in the first authentication or the second authentication.

5. The information processing method according to claim 1, wherein:
in the second authentication, the external device is authenticated by first reading data required for authenticating the external device from data included in the snapshot of data after the information processing device is powered ON again; and
after the second authentication, other data included in the snapshot of data is read, and a process that uses the other data is performed.

6. The information processing method according to claim 1, further comprising:
deleting the snapshot stored in the auxiliary storage device when a predetermined program installed on the information processing device is updated,
wherein in the acquiring of the snapshot of data, the snapshot stored in the main storage device of the information processing device is acquired in a case when the snapshot is not stored in the auxiliary storage device after the information processing device is powered ON.

7. An information processing device connected to at least one external device, the information processing device comprising:
a processor programmed to:
power ON the information processing device;
acquire, from the information processing device, a snapshot of data stored in a main memory of the information processing device in a state where the at least one external device is not authenticated, after the information processing device is powered ON;
store the snapshot of data in an auxiliary memory of the information processing device;
perform a first authentication of the at least one external device in which the information processing device authenticates the external device after the snapshot of data is stored in the auxiliary memory;
re-start the information processing device based on the snapshot of data stored in the auxiliary memory; and
perform a second authentication of the at least one external device in which the information processing device re-authenticates the at least one external device again after the information processing device is re-started based on the snapshot of data.

8. A non-transitory computer readable medium storing a program for use with an information processing device having a processor and being connected to at least one external device, the program causing the information processing device to execute a process comprising:

powering ON the information processing device;

acquiring, from the information processing device, a snapshot of data stored in a main memory of the information processing device in a state where the at least one external device is not authenticated, after the information processing device is powered ON;

storing the snapshot of data in an auxiliary memory of the information processing device;

performing a first authentication of the at least one external device in which the information processing device authenticates the external device after the snapshot of data is stored in the auxiliary memory;

re-starting the information processing device based on the snapshot of data stored in the auxiliary memory; and performing a second authentication of the at least one external device in which the information processing device re-authenticates the at least one external device again after the information processing device is re-started based on the snapshot of data.

\* \* \* \* \*